United States Patent
Goldfarb et al.

(10) Patent No.: US 10,115,246 B1
(45) Date of Patent: Oct. 30, 2018

(54) DRIVER IDENTIFICATION FOR TRIPS ASSOCIATED WITH ANONYMOUS VEHICLE TELEMATICS DATA

(71) Applicant: STATE FARM MUTUAL AUTOMOBILE INSURANCE COMPANY, Bloomington, IL (US)

(72) Inventors: Meghan Sims Goldfarb, Champaign, IL (US); Scott Thomas Christensen, Salem, OR (US); Taylor Michael Thiel, Urbana, IL (US); Anuj Dahiya, Naperville, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 188 days.

(21) Appl. No.: 15/010,381

(22) Filed: Jan. 29, 2016

(51) Int. Cl.
*G07C 5/02* (2006.01)
*G06Q 40/08* (2012.01)
*G01S 19/42* (2010.01)

(52) U.S. Cl.
CPC ............. *G07C 5/02* (2013.01); *G01S 19/42* (2013.01); *G06Q 40/08* (2013.01)

(58) Field of Classification Search
CPC ........ G06Q 40/08; G06Q 50/30; G06Q 10/00; G06Q 10/0635; G06Q 30/0265; G06Q 30/00; G06Q 30/02; G06Q 30/0207; G06Q 30/0224; G06Q 30/0283; G06Q 30/06; G06Q 30/0645; G06Q 40/00; G06Q 10/02; G06Q 10/04; G06Q 10/0639;

(Continued)

(56) References Cited

U.S. PATENT DOCUMENTS 8,914,366 B1 * 12/2014 Li .................... G06F 17/3071
 707/737
2015/0116493 A1 * 4/2015 Bala .................. G06K 9/00845
 348/148

(Continued)

OTHER PUBLICATIONS

Driver Telematics Analysis, "Use Telematic Data to Identify a Signature", https://www.kaggle.com/c/axa-driver-telematics-analysis, retrieved from the Internet on Jan. 29, 2016, 2 pages.

*Primary Examiner* — Jelani A Smith
*Assistant Examiner* — Kelly D Williams
(74) *Attorney, Agent, or Firm* — Marshall, Gerstein & Borun LLP; Randall G. Rueth (57) ABSTRACT

A method for attributing vehicle telematics data to individuals may include receiving vehicle telematics data collected by a data collection device during a plurality of trips. Subsets of the vehicle telematics data may correspond to different trips, and may be used to generate respective metric sets. Each metric set may include one or more metrics each indicative of a different driving behavior or a different feature of a driving environment. The method may also include retrieving, from a policy database, policy information pertaining to an insurance policy associated with the data collection device, and determining, based upon the policy information, a number of disclosed drivers associated with the insurance policy. A statistical analysis may be performed on the metric sets, and, based upon the results, at least some of the metrics and/or at least some of the subsets of vehicle telematics data may be assigned to the disclosed drivers.

8 Claims, 5 Drawing Sheets

(58) Field of Classification Search
CPC .............. G06Q 10/083; G06Q 10/105; G06Q 10/1095; G06Q 10/20; G06Q 20/145; G06Q 30/012; G06Q 30/0205; G06Q 30/0208; G06Q 30/0251; G06Q 30/0266; G06Q 30/0273; G06Q 30/04; G06Q 30/0633; G06Q 30/0639; G06Q 40/02; G06Q 50/01; G07C 5/008; G07C 5/00; G07C 5/085; G07C 5/02; G07C 5/08; G07C 5/0808; G07C 5/0825; G07C 5/006; G07C 5/06; G07C 5/0833; G07C 5/0841; G07C 9/00126; G07C 9/00158; G08G 1/166; G08G 1/096775; G08G 1/165; G08G 1/0112; G08G 1/096791; G08G 1/167; G08G 1/0129; G08G 1/0141; G08G 1/096716; G08G 1/096725; G08G 1/096741; G08G 1/096827; G08G 1/143; G08G 1/163; G08G 1/205; G08G 1/01; G08G 1/0133; G08G 1/015; G08G 1/017; G08G 1/09; G08G 1/0962; G08G 1/0965; G08G 1/09675; G08G 1/096758; G08G 1/096816; G08G 1/096838; G08G 1/096844; G08G 1/147; G08G 1/16; G08G 1/162; G08G 1/20; G06F 3/017; G06F 3/0481; G06F 3/04842; G06F 3/0488; G06F 11/3013; G06F 11/3065; G06F 11/328; G06F 13/14; G06F 13/364; G06F 17/00; G06F 17/28; G06F 17/30247; G06F 17/30386; G06F 17/30557; G06F 17/30598; G06F 17/30705; G06F 17/3071; G06F 17/30864; G06F 21/00; G06F 21/10; G06F 21/121; G06F 21/31; G06F 21/32; G06F 21/335; G06F 21/629; G06F 2203/04808; G06F 2221/0724; G06F 3/00; G06F 3/016; G06F 3/0227; G06F 3/048; G06F 3/04817; G06F 3/0482; G06F 3/0484; G06F 3/04847; G06F 3/0486; G06F 3/04883; G06F 3/147; G06F 8/61; G06F 8/65; G06F 9/44505; G06F 9/54

See application file for complete search history.

(56) References Cited

U.S. PATENT DOCUMENTS

| | | | |
|---|---|---|---|
| 2015/0187019 A1* | 7/2015 | Fernandes | G06Q 40/08 705/4 |
| 2015/0343947 A1* | 12/2015 | Bernico | B60Q 9/00 340/436 |
| 2017/0124660 A1* | 5/2017 | Srivastava | G06Q 40/08 |
| 2017/0147930 A1* | 5/2017 | Bellala | G06N 5/04 |

* cited by examiner

DRIVER IDENTIFICATION FOR TRIPS ASSOCIATED WITH ANONYMOUS VEHICLE TELEMATICS DATA

FIELD OF THE DISCLOSURE

The present disclosure generally relates to vehicle telematics and, more specifically, to systems and methods for identifying drivers based upon vehicle telematics data.

BACKGROUND

Current technologies make use of vehicle telematics data to assess driving behavior. For example, the telematics data may be collected and analyzed to determine the acceleration, braking and/or cornering habits of a driver of a vehicle, and the results of the analysis may be used to measure the performance of the driver over time. The telematics data may be generated by sensors on the vehicle, or by a mobile device (e.g., smart phone) carried by the driver, for example. The measured performance may then be used for various purposes, such as modifying an insurance rating of the driver.

Typically, the insurance policy with which a particular set of vehicle telematics data is associated is known. If the vehicle telematics data is generated by a data collection device installed in a vehicle, for example, the data may include a unique identifier of the vehicle and/or data collection device, which can be matched to a particular auto insurance policy. As another example, if the vehicle telematics data is generated by a personal data collection device (e.g., a smart phone), the data may include a unique identifier of the driver and/or personal data collection device, which can also be matched to a particular auto insurance policy. In some scenarios, however, there can be ambiguity concerning who was driving a vehicle when a particular set of vehicle telematics data was generated. Even if a mobile device is known to be owned by a particular person, for example, vehicle telematics data generated by that mobile device may have been generated while the person was sitting in a passenger seat. As another example, a data collection device installed on a vehicle may generate vehicle telematics data without providing any indication of who was driving while that data was generated. Thus, an insurance provider may not know whether a particular portion of the vehicle telematics data (e.g., a portion corresponding to a particular driving trip) reflects the driving performance of a primary insured, the driving performance of another individual disclosed on the insurance policy (e.g., the spouse of the primary insured), or even the driving performance of a driver not disclosed on the insurance policy (e.g., a friend of the primary insured, or a friend of another disclosed driver). If driving performance is not correctly attributed, the insurance provider may be unable to accurately assess the risk associated with particular drivers. For these and other reasons, techniques for accurately attributing sets of vehicle telematics data to individuals would be beneficial. Further, because past driving performance or behaviors for individuals listed on an insurance policy may not be known (e.g., due to an absence of any vehicle telematics data that is known to correspond to each individual), attribution techniques that do not require such historical information may be particularly beneficial.

BRIEF SUMMARY

The present embodiments may, inter alia, utilize insurance policy information to more easily, efficiently and/or accurately determine which sets of vehicle telematics data should be attributed to various individuals, even in the absence of historical vehicle telematics data and/or driving performance information for those individuals. By increasing the accuracy of the data attribution in these situations, an insurance provider or other entity may more accurately assess driving risk and/or performance for one or more individuals.

In one aspect, a method for attributing vehicle telematics data to individuals may include receiving, at a server, vehicle telematics data collected by a data collection device during a plurality of trips. The vehicle telematics data may include a plurality of subsets of vehicle telematics data each corresponding to a different one of the plurality of trips. The method may also include, for each subset of the plurality of subsets of vehicle telematics data, using the subset of vehicle telematics data to generate a respective one of a plurality of metric sets. Each of the plurality of metric sets may include one or more metrics each indicative of a different driving behavior or a different feature of a driving environment. The method may also include retrieving, by the server and from a policy database, policy information pertaining to an insurance policy associated with the data collection device, and determining, by the server and based upon the retrieved policy information, a number N of disclosed drivers associated with the insurance policy, with N being greater than or equal to zero. The method may also include performing, by the server, a statistical analysis on the plurality of metric sets, and, for each metric set of at least some of the plurality of metric sets, and based upon results of the statistical analysis, assigning, by the server, one of both of (i) the metric set, and (ii) the corresponding one of the plurality of subsets of vehicle telematics data, to one of the N disclosed drivers.

In another aspect, a server may include one or more processors and a memory. The memory may store instructions that, when executed by the server, cause the server to receive vehicle telematics data collected by a data collection device during a plurality of trips. The vehicle telematics data may include a plurality of subsets of vehicle telematics data each corresponding to a different one of the plurality of trips. The instructions may also cause the server to, for each subset of the plurality of subsets of vehicle telematics data, use the subset of vehicle telematics data to generate a respective one of a plurality of metric sets. Each of the plurality of metric sets may include one or more metrics each indicative of a different driving behavior or a different feature of a driving environment. The instructions may also cause the server to retrieve, from a policy database, policy information pertaining to an insurance policy associated with the data collection device, and determine, based upon the retrieved policy information, a number N of disclosed drivers associated with the insurance policy, with N being greater than or equal to zero. The instructions may also cause the server to perform a statistical analysis on the plurality of metric sets, and, for each metric set of at least some of the plurality of metric sets, and based upon results of the statistical analysis, assign one or both of (i) the metric set, and (ii) the corresponding one of the plurality of subsets of vehicle telematics data, to one of the N disclosed drivers.

BRIEF DESCRIPTION OF THE DRAWINGS

The figures described below depict various aspects of the systems and methods disclosed herein. It should be understood that each figure depicts an embodiment of a particular aspect of the disclosed systems and methods, and that each of the figures is intended to accord with one possible embodiment thereof.

DETAILED DESCRIPTION

Aspects of the present invention relate to attributing different portions of anonymous vehicle telematics data to individuals, including in scenarios where little or no historical vehicle telematics data (and, potentially, little or no driving performance data from other sources) is available for those individuals. The vehicle telematics data may include any sensed or monitored information from which driving behaviors, and/or features of the driving environment, may be calculated or otherwise inferred. While sometimes referred to herein as "anonymous" vehicle telematics data, certain information may be known about the source of the data. For example, it may be known that the vehicle telematics data was collected by, and possibly also generated by, a specific data collection device known to be associated with a particular insurance policy. A given data collection device may be linked to a particular insurance policy in various ways. For example, a sensor/telematics system may transmit telematics data along with a source address or other identifier that identifies the system as being installed in a vehicle of a person listed on the insurance policy. As another example, a smart phone may transmit telematics data along with a source address or other identifier that identifies the smart phone as belonging to a person listed on the insurance policy (e.g., the primary insured).

The anonymous vehicle telematics data may be processed (e.g., by a server of the insurance provider) to generate a number of metric sets. Each metric set may correspond to a different trip, and may include one or more metrics that are indicative of one or more respective driving behaviors and/or environmental factors, such as how "smoothly" a particular trip was driven, whether a trip was driven at night, or whether a trip was driven on a highway, for example. Generally, a given metric may be within a particular range (e.g., a score between 1 and 100 to represent the degree of smooth driving, or how much of a trip is driven at night, etc.), or may be binary (e.g., 100 if the trip is driven primarily at night, or 0 if the trip is not driven primarily at night, etc.). A "trip" may correspond to a particular driving session (e.g., as measured from the time of ignition to the time of stopping the vehicle engine), for example. After the metric sets have been generated, a statistical analysis may be performed on the metric sets. While any suitable statistical analysis technique known in the art may be used (e.g., machine learning), clustering algorithms such as k-means clustering or Ward clustering may lend themselves particularly well to the techniques of the present invention.

The results of the statistical analysis may be used to determine which metric sets appear to (e.g., are more statistically likely to) correspond to the same driver, and/or which portions of the underlying vehicle telematics data appear to correspond to the same driver. In this manner, an apparent number of drivers may generally be identified (e.g., by determining the number of distinct clusters formed by the metric sets). In some implementations, the apparent number of drivers may also be compared with the number of drivers disclosed on an insurance policy with which the data collection device is associated. Thus, for example, policy records may be accessed to count the number of drivers listed/disclosed on the policy, and each cluster of metric sets may be assigned to a different disclosed driver. Generally, the number of disclosed drivers may inform a system implementing the present invention (e.g., a server) as to the number of distinct drivers that one would expect to see with a relatively high frequency.

In various implementations and/or scenarios, clusters may be attributed/assigned to specific disclosed drivers, and/or clusters may be assigned to disclosed drivers in only a general sense. If, for instance, it is determined that two potential drivers are listed on a particular policy, and if a clustering algorithm returns two distinct clusters, then the metric sets in the larger cluster (and/or the corresponding vehicle telematics data) may be attributed/assigned to the primary insured listed on the policy, while the metric sets in the smaller cluster (and/or the corresponding vehicle telematics data) may be assigned to the other potential driver. Alternatively, the metric sets and/or telematics data corresponding to the two clusters may be only generally assigned to the two disclosed drivers, without specifying which of the two clusters/metrics/data corresponds to which of the two disclosed drivers.

Some metric sets may be "outliers" that are not associated with any cluster, and therefore are not assigned (generally or specifically) to any disclosed driver. Alternatively, such metric sets (and/or the corresponding vehicle telematics data) may be assigned to an "undisclosed driver" category. In still other implementations, metric sets and/or the corresponding vehicle telematics data may be attributed to undisclosed drivers if and only if a number of metric set clusters exceeds the number of disclosed drivers. If, for example, five clusters are identified, but the policy lists only three potential drivers, it may be determined that there are two undisclosed drivers.

In some implementations, policy information about disclosed drivers is used not only at the attribution/assignment stage, but also earlier in the process by using the number of disclosed drivers as an input or parameter for the statistical analysis. If a k-means clustering algorithm is used, for example, k may be set equal to the number of disclosed drivers so long as that number is greater than zero. In other implementations, however, information about the disclosed drivers is used only at a later stage, when assigning metric sets and/or the corresponding portions of vehicle telematics data.

In still other implementations, the algorithm used for statistical analysis is itself dependent on the number of disclosed drivers. In some implementations and scenarios where only a single driver is listed on a policy, for example, known outlier/anomaly detection techniques may be used to determine which trips/data portions should be assigned to the single driver, and which trips/data portions should instead be attributed to an undisclosed driver (and/or labeled as "undetermined," etc.).

These and other aspects and implementations of the invention, which are described in further detail below, may provide different benefits in various different implementations. For example, attribution of vehicle telematics data to specific individuals may permit an insurance provider to calculate a risk score or rating for each of those individuals, and set insurance premiums (or perform underwriting, etc.) in a manner that accurately reflects risk for each of those individual. Similar benefits may be obtained even if the different portions of vehicle telematics data are assigned to individuals in only a general sense (e.g., generally assigning three of four identified clusters to three disclosed drivers, while determining the fourth cluster is attributable to an undisclosed driver). For instance, the attribution of vehicle telematics data to undisclosed drivers may permit an insurance provider to modify insurance ratings, and/or prompt the insurance provider to contact an insured regarding the undisclosed driver(s).

Figure 1:
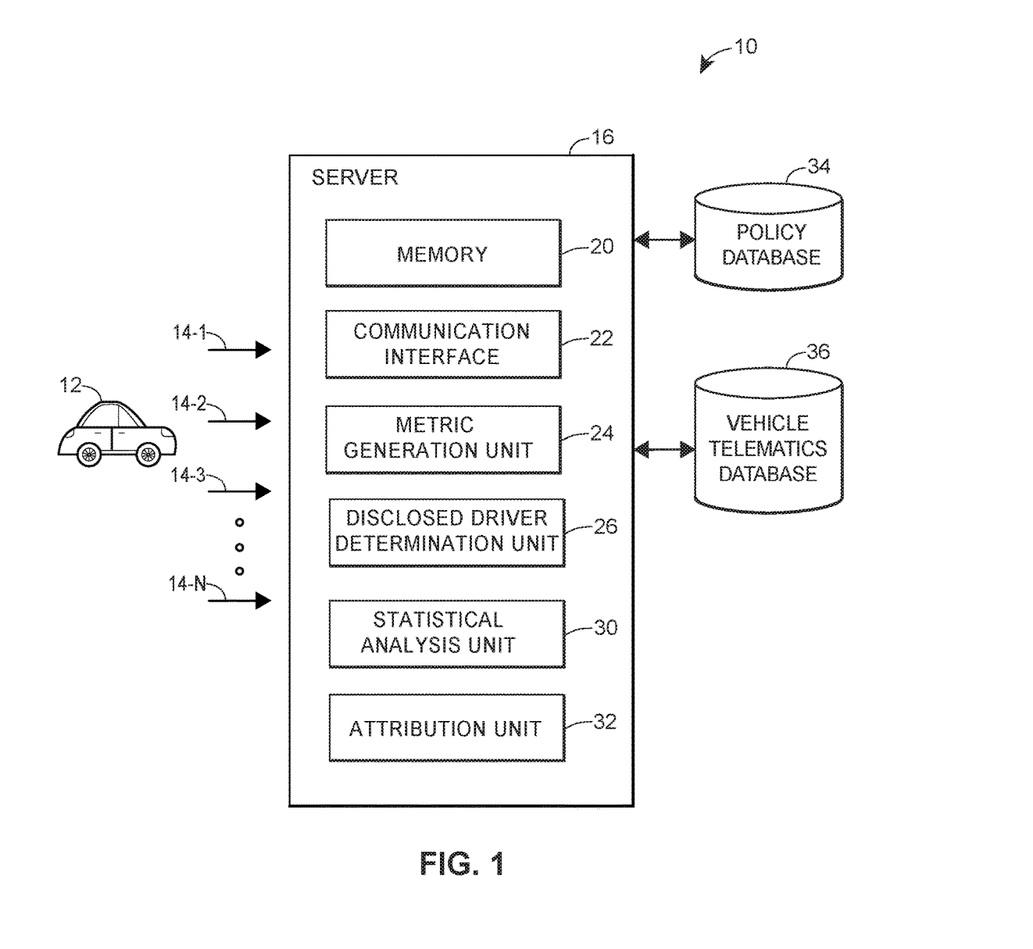
FIG. 1 depicts an exemplary environment in which anonymous vehicle telematics data may be generated, collected, and attributed to individuals, according to one implementation.

FIG. 1 depicts an exemplary environment 10 in which vehicle telematics data may be generated, collected, and attributed to individuals, according to an embodiment. As illustrated in FIG. 1, the environment 10 may include a vehicle 12. The vehicle 12 may carry a data collection device (not shown in FIG. 1) used to collect various types of telematics data. As used herein, a "data collection device" may include one or more components of a sensor/telematics system within a vehicle such as vehicle 12, and/or may include a personal electronic device of an individual (e.g., a smart phone) that a driver or passenger carries, places or mounts within the vehicle. The data collection device may also include sensors and/or subsystems that generate the telematics data itself, or may simply collect the telematics data after another device or devices has/have generated the telematics data.

The telematics data collected by the data collection device of vehicle 12 may include any data that may be sensed or monitored and may be used to calculate or otherwise infer driving behaviors and/or features of a driving environment. For example, the data may include any one or more of velocity information, acceleration information, braking information, steering information, location/position information (e.g., collected by a vehicular global positioning system (GPS) device), translational and/or rotational G-force information (e.g., collected by a gyroscope device), on-board diagnostic information, information collected by a camera, video camera, LiDAR, radar or other device sensing an environment external to the vehicle (e.g., sensing proximity to other vehicles or other objects, orientation with respect to other vehicles or other objects, etc.), automated safety and/or control system information (e.g., adaptive cruise control status and/or when cruise control is engaged/disengaged, forward and/or rear collision warning system outputs, lane departure system outputs, electronic stability control system status, etc.), and so on. In some implementations, however, the vehicle telematics data includes at least acceleration and location data for the vehicle 12.

The data collection device may send the telematics data to a server 16 via one or more transmissions. In FIG. 1, each of transmissions 14-1 through 14-N corresponds to a subset of the telematics data that was collected during a respective trip. While FIG. 1 depicts transmissions 14-1 through 14-N as distinct transmissions, in some implementations and scenarios the transmissions 14-1 through 14-N are sent to the server 16 in fewer than N communications (e.g., one communication). Further, in some implementations and scenarios, not all of the subsets 14-1 through 14-N are collected during trips in vehicle 12. If the data collection device is a smart phone, for example, some of the subsets 14-1 through 14-N may have been collected while the owner of the smart phone was driving (or a passenger in) vehicle 12, while other of the subsets 14-1 through 14-N may have been collected while the owner of the smart phone was driving (or a passenger in) a different vehicle listed on the same insurance policy as vehicle 12.

The transmissions 14-1 through 14-N may be sent to server 16 via a wireless transmitter or transceiver that is coupled to the data collection device. Alternatively, the data collection device may be equipped with a Bluetooth system that provides the telematics data to a smart phone or other portable communication device of the driver or a passenger, and the smart phone or other portable communication device may transmit the data to the server 16 via a wireless network. In other implementations, the data collection device may include an interface to a portable memory device, such as a portable hard drive or flash memory device. In some of these implementations, the portable memory device may be used to download data from the data collection device and then manually carried to the server 16. In still other implementations, the portable memory device may be used to download telematics data from the data collection device to a driver's or passenger's computer device (e.g., a desktop computer, laptop computer, smartphone, etc.), which may in turn be used to transmit the telematics data to the server 16 via one or more wired and/or wireless networks.

The server 16 may include a memory 20, a communication interface 22, a metric generation unit 24, a disclosed driver determination unit 26, a statistical analysis unit 30, and an attribution unit 32, each of which will be described in more detail below. The communication interface 22 may include hardware (e.g., one or more physical ports, one or more network interface cards, etc.) and/or software (e.g., software executed by one or more processors of server 16) configured to enable server 16 to receive transmissions of data collected by different data collection devices. If the data transmissions are made via the Internet, for example, the communication interface 22 may include an Ethernet port. Telematics data received via communication interface 22 may be stored in vehicle telematics database 36, which may include one or more persistent memories (e.g., read-only memory (ROM), hard disk memory, optical disk memory, etc.). Vehicle telematics database 36 may include a relational database that associates each subset of telematics data with its source (e.g., the data collection device that collected the data, and/or an identifier of an insurance policy with which the data collection device is associated, etc.).

Generally, metric generation unit 24 may generate, based upon vehicle telematics data, various metrics that are indicative of different driving behaviors and/or environmental features (e.g., driving maneuvers, driving patterns, amount of daylight, etc.). For example, metric generation unit 24 may process acceleration and braking/deceleration data (e.g., sourced by an accelerometer) and cornering data (e.g., sourced by a gyroscope) to calculate a metric that measures how "smoothly" a vehicle was driven. As another example, metric generation unit 24 may process video data from a smart phone camera or vehicle-mounted camera, in conjunction with speed data, to determine how close, on average, a vehicle was driven to other, leading vehicles (e.g., while driving at more than a threshold speed) to calculate a metric that measures a degree of "tailgating." As yet another example, metric generation unit 24 may process video data from a smart phone camera or vehicle-mounted camera to determine what percentage of time a vehicle was driven on a highway to calculate a metric that measures an amount of highway driving. The metric generation unit 24 may also, or instead, generate virtually any other types of metrics that are indicative of particular driving behaviors or environmental features. Generally, the driving behaviors and/or environmental features may include those that are indicative of risk level (e.g., measures of tailgating, seat belt usage, driving at night, etc.), and/or those that are not necessarily indicative of risk level. In some implementations, each metric corresponds to a particular driving behavior or environmental feature during a particular trip. Thus, for instance, one metric may measure smooth driving during a first trip, another metric may measure smooth driving during a second trip, and so on.

Disclosed driver determination unit 26 may generally access insurance policy records stored in a policy database 34 to determine how many drivers are disclosed on particular policies. Policy database 34 may include one or more persistent memories (e.g., ROM, hard disk memory, optical disk memory, etc.) that store the policy information. Policy database 34 may be arranged as a single database, or a set of different databases. The disclosed driver determination unit 26 may also retrieve other information from the policy database 34, such as identification of the primary insured, the relation of other disclosed drivers to the primary insured, and so on.

Statistical analysis unit 30 may generally process the metrics generated by metric generation unit 24 according to a statistical analysis model. For example, statistical analysis unit 30 may employ a clustering algorithm that accepts as an input a set of metrics corresponding to a particular driving trip, and returns an indication of which metric sets belong to which clusters. The clustering may be a k-means clustering algorithm, a Ward clustering algorithm, an expectation-maximization (EM) clustering algorithm, a "flexible" clustering algorithm, or any other suitable clustering algorithm. Alternatively, statistical analysis unit 30 may employ a machine learning or other suitable algorithm. Depending on the algorithm that statistical analysis unit 30 employs, statistical analysis unit 30 may or may not make use of the number of disclosed drivers as determined by disclosed driver determination unit 26. If statistical analysis unit 30 uses a k-means clustering algorithm, for example, k may initially be set equal to the number of disclosed drivers.

Attribution unit 32 generally uses the output/results of the statistical analysis, and the information retrieved by the disclosed driver determination unit 26, to attribute/assign particular metric sets (e.g., metric sets corresponding to particular trips), and/or the portions of vehicle telematics data corresponding to those metric sets, to drivers. The metric sets and/or data portions may be assigned to drivers in a general sense (e.g., by assigning metric sets and/or data portions for a set of three clusters to three disclosed drivers, without indicating which metric set and/or data portion corresponds to which driver), in a more specific manner (e.g., by assigning metric sets and/or data portions for a larger cluster to a primary insured and a metric sets and/or data portions for a smaller clustered to a second disclosed driver), or in some combination of the two (e.g., by assigning metric sets and/or data portions for a largest cluster to a primary insured, and only generally assigning metric sets and/or data portions for two remaining clusters to two other disclosed drivers).

Attribution unit 32 may assign metric sets and/or data portions to individuals, in either a general or specific sense, by modifying data associated with the corresponding portions of telematics data in the vehicle telematics database 36. In one implementation and scenario where a first group or cluster of metric sets is attributable to a specific individual (e.g., the primary insured), for example, attribution unit 32 may modify a relational database of vehicle telematics database 36 to indicate that the telematics data corresponding to the first group or cluster of metric sets is associated with that individual. As another example, in one implementation and scenario where a two groups or clusters of metric sets are generally attributable to two disclosed drivers, attribution unit 32 may modify a relational database of vehicle telematics database 36 to indicate that the telematics data corresponding to the two groups or clusters of metric sets are both generally associated with the two disclosed drivers. In some implementations where particular metric sets, and/or particular portions of telematics data, have been assigned to a specific individual, the server 16 (or another server not shown in FIG. 1) may adjust a risk score or rating for that individual based on further processing of those metric sets and/or data portions, for example.

In some implementations, statistical unit 30 and/or attribution unit 32 also identifies outliers, i.e., metric sets that do not appear to be statistically likely to correspond to any identifiable driver in either a general or a specific sense. If statistical analysis unit 30 cannot group a particular metric set with any cluster, for example, attribution unit 32 may label the driver/individual associated with that metric set as "undetermined" (e.g., by modifying data in vehicle telematics database 36). That portion of telematics data may then be ignored when calculating a risk score or other rating, for example. Alternatively, attribution unit 32 may determine that a metric set that is not a part of any cluster is attributable to an undisclosed driver (i.e., a single, but unknown, driver), and modify data in vehicle telematics database 36 to indicate that the telematics data corresponding to that metric set is associated with an undisclosed driver. In other implementations, attribution unit 32 only determines that an undisclosed driver has been operating a vehicle if statistical analysis unit 30 returns a number of distinct clusters that exceeds the number of drivers disclosed on the policy (as determined by disclosed driver determination unit 26).

In some implementations, information about the drivers disclosed on an insurance policy is used not only by attribution unit 32, but also earlier in the process by statistical analysis unit 30. In particular, statistical analysis unit 32 may use the number of disclosed drivers, as determined by disclosed driver determination unit 26, as an input or parameter for a clustering or other algorithm. If a k-means clustering algorithm is used, for example, statistical analysis unit 32 may set k equal to the number of disclosed drivers. In this manner, statistical analysis unit 32 may improve the accuracy and/or efficiency with which portions of vehicle telematics data are assigned to particular individuals.

In some implementations and scenarios where only one driver is disclosed, statistical analysis unit 30 uses known anomaly detection techniques, such as minimum-enclosing ball (MEB) or one-class support vector machine (SVM) techniques, for example. All portions of vehicle telematics data corresponding to the anomalous/outlier metric sets may then be assigned to an undisclosed driver, or labeled as "undetermined," for example.

In an embodiment, each of units 24, 26, 30 and/or 32 may be (or may include) a respective set of one or more processors of server 16 that executes software instructions to perform the functions described above, or the units 24, 26, 30 and/or 32 may share one or more processors of server 16.

Alternatively, each of units 24, 26, 30 and/or 32 may be a component of software that is stored in memory 20. The memory 20 may include a persistent memory such as ROM, for example. The software may be executed by one or more processors of server 16 to perform the functions described herein. In some embodiments, server 16 may include more, fewer and/or different units than are shown in FIG. 1, including units that execute other of the functions discussed herein. For example, server 16 may include a unit that generates risk scores for individuals based on the telematics data stored in vehicle telematics database 36, and/or a unit that determines insurance premiums based on those risk scores.

Figure 2:
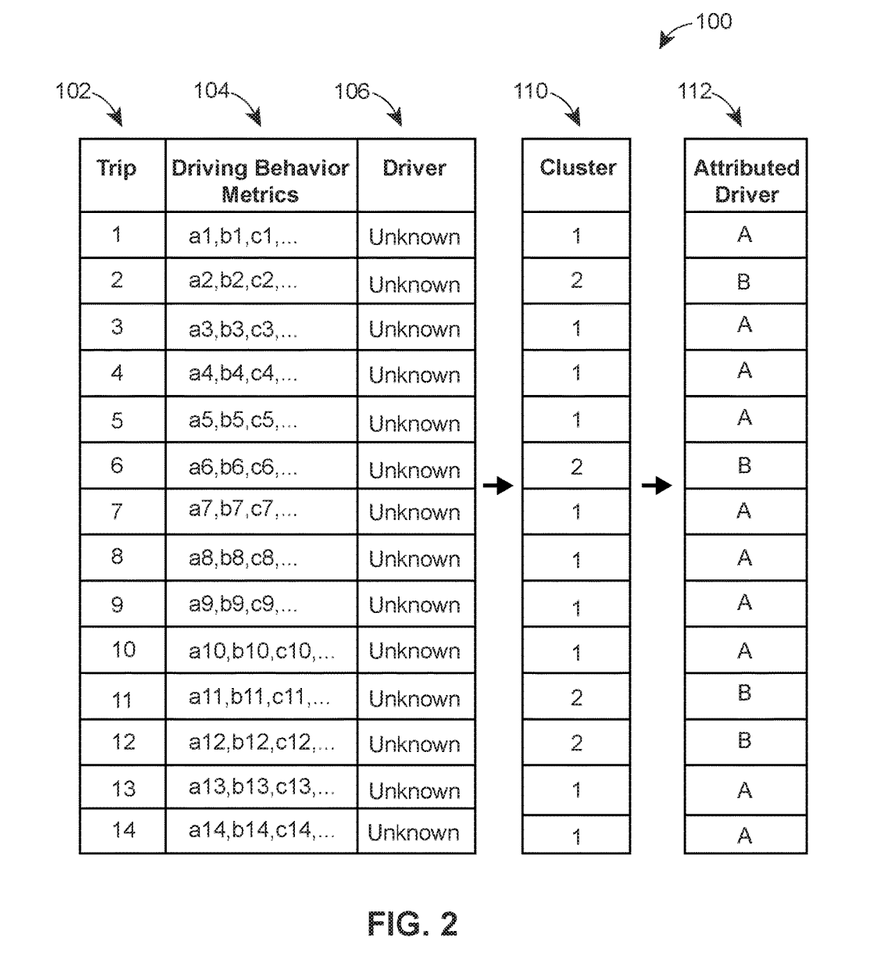
FIG. 2 depicts an exemplary process for attributing multiple sets of anonymous vehicle telematics data to individuals, according to one implementation and scenario.

Operation of the components of the environment 10 will now be described in connection with FIGS. 2 through 4, according to various implementations and scenarios. Referring first to FIG. 2, an example process 100 may be implemented in the environment 10. Each of trips 102 of FIG. 2 corresponds to one of the transmissions 14-1 through 14-N of FIG. 1 (i.e., in this scenario, N is equal to 14). After communication interface 22 receives the subsets of telematics data corresponding to transmissions 14-1 through 14-14, server 16 may store the subsets of telematics data in vehicle telematics database 36.

Either on a one-by-one basis as telematics data subsets are received and stored, or at a later time, metric generation unit 24 may process the telematics data subsets to generate corresponding metric sets, which are shown in FIG. 2 as metric sets 104. Each metric letter in FIG. 2 ("a," "b" or "c") represents a particular type of metric corresponding to a particular driving behavior. In some embodiment, however, each of some or all of the metric letters may represent a particular type of metric corresponding to a particular environmental feature. For example, all metrics staring with the letter "a" may measure "smooth" driving, all metrics starting with the letter "b" may measure average tailgating distance, all metrics starting with the letter "c" may measure a percentage of highway or night time driving, and so on. Each concatenation of a metric letter and a trip number (e.g., "a1," "a2," etc.) represents a particular metric value. For example, "a1" may represent a score of 72 for smooth driving during Trip 1, "b1" may represent a score of 45 for average tailgating distance during Trip 1, "a2" may represent a score of 87 for smooth driving during Trip 2, and so on. Any number of metrics may be included in each of the metric sets 104 (e.g., more or fewer than three metrics per metric set 104). Moreover, while FIG. 2 shows metric sets 104 for fourteen trips 102, other scenarios may include metric sets for more or fewer trips.

As is also seen in FIG. 2, a driver 106 for each of trips 102 (and each of the corresponding metric sets 104) is initially unknown to server 16. However, server 16 may be able to ascertain an insurance policy corresponding to all of trips 102 and metric sets 104. If the transmissions 14-1 through 14-14 included an identifier of the data collection device that initially collected the data therein, for example, disclosed driver determination unit 26 may access a database (e.g., policy database 34, vehicle telematics database 36, or another database not shown in FIG. 1) to correlate that identifier with a particular policy number. Once the policy number is known, disclosed driver determination unit 26 may access policy database 34 to determine how many drivers are listed/disclosed for that policy.

Statistical analysis unit 30 may perform a statistical analysis on the metric sets 104. While other techniques (e.g., machine learning) may be used, FIGS. 2 through 4 reflect an implementation in which statistical analysis unit 30 uses a clustering algorithm. In embodiments where statistical analysis unit 30 uses a clustering algorithm that requires or otherwise benefits from an initial indication of the number of expected clusters, the number of disclosed drivers, as determined by disclosed driver determination unit 26, may be used as an input or parameter of the clustering algorithm. If k-means clustering or EM clustering is used, for example, a parameter of the algorithm may be set equal to the number of disclosed drivers (e.g., k may be set equal to the number of disclosed drivers if statistical analysis unit 30 uses k-means clustering).

Statistical analysis unit 30 may generate/output indications 110 of which of metric sets 104 belong to which clusters. As seen in the example scenario of FIG. 2, Trips 2, 6, 11 and 12 of trips 102 belong to Cluster 2, while all remaining trips 102 belong to Cluster 1. Based on the indications 110, attribution unit 32 may determine that the metric sets 104 for Trips 2, 6, 11 and 12 of trips 102 should be attributed to driver/individual B, with all other trips 102 being attributable to driver/individual A, as reflected by attributed drivers 112 in FIG. 2. Attribution unit 32 may then assign the metric sets, and/or the portions of vehicle telematics data corresponding to those metric sets, accordingly. In one implementation, attribution unit 32 specifically assigns all "driver A" metric sets (and/or the corresponding telematics data portions) to the primary insured, under the assumption that the primary insured will do the most driving under the corresponding insurance policy. In other implementations, attribution unit 32 generally assigns all "driver A" metric sets (and/or the corresponding telematics data portions) to a first disclosed driver, and all "driver B" metric sets (and/or the corresponding telematics data portions) to a second disclosed driver, without specifying which specific individuals (e.g., primary insured, or a specific other disclosed driver) correspond to which of the metric set and/or telematics data portion groupings.

Figure 3:
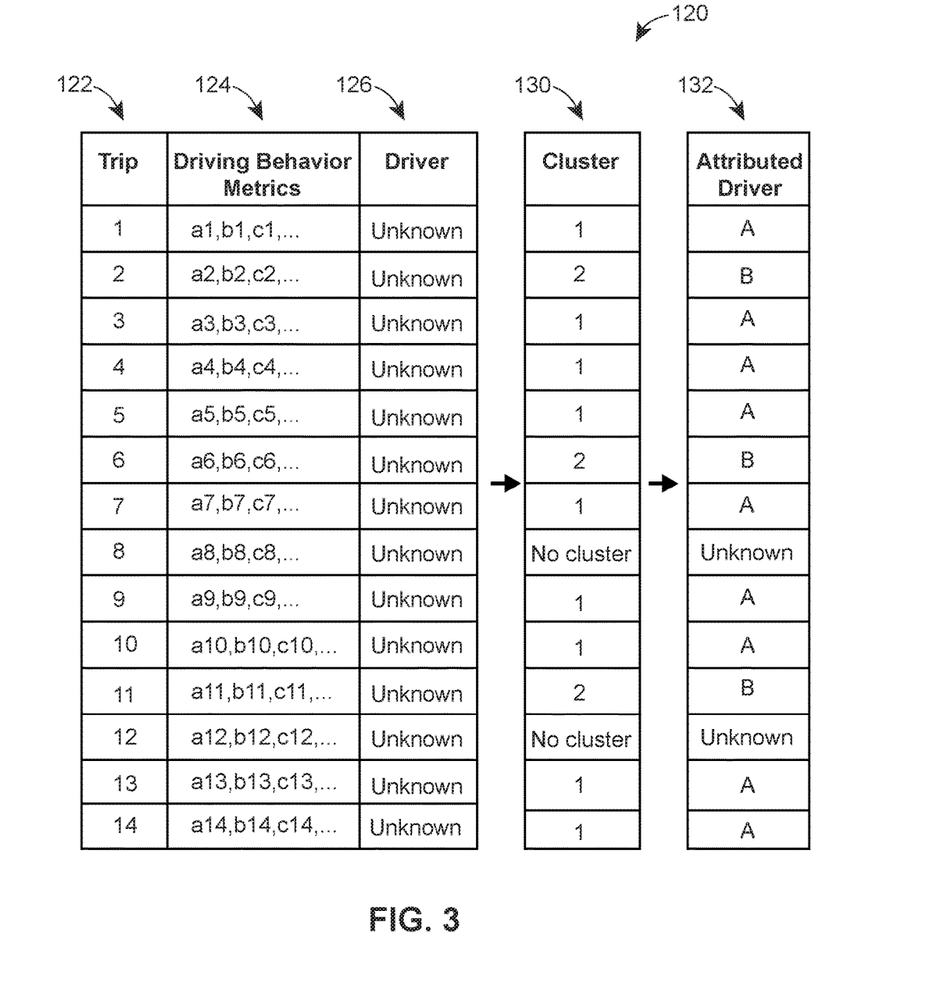
FIG. 3 depicts another exemplary process for attributing multiple sets of anonymous vehicle telematics data to individuals, according to one implementation and scenario.

Referring now to FIG. 3, an example process 120 reflects a scenario in which certain metric sets cannot reliably be attributed to any particular cluster. In the process 120, trips 122, metric sets 124 and drivers 126 may be similar to trips 102, metric sets 104 and drivers 106 of process 100. Here, however, statistical analysis unit 30 is unable to attribute two of the metric sets 104 (i.e., the metric sets corresponding to Trips 8 and 12) to any particular cluster, and therefore the corresponding indications of indications 130 are labeled "no cluster." For example, the metric sets associated with Trips 8 and 12 may be at least some threshold distance from any other metric sets, or statistical analysis unit 30 may decide not to label those metric sets with any particular cluster for other reasons (e.g., based upon a rule that no cluster can include a metric set more than some threshold distance from the centroid of the cluster, etc.). Based upon the designation by statistical analysis unit 30, attribution unit 32 may set the attributed drivers for Trips 8 and 12 (among attributed drivers 132) as "unknown." In different implementations, the "unknown" category may be viewed as "indeterminate" (e.g., the corresponding metric sets and/or telematics data portions are simply discarded or ignored) or as being indicative of one or more undisclosed drivers. In one implementation, the metric sets and/or telematics data portions corresponding to Trips 8 and 12 are only attributed to an undisclosed driver if both metric sets are sufficiently similar (e.g., only if statistical analysis unit 30 groups the metric sets for the two trips into a same, third cluster, and only if disclosed driver determination unit 26 determines that the policy only lists two drivers).

Figure 4:
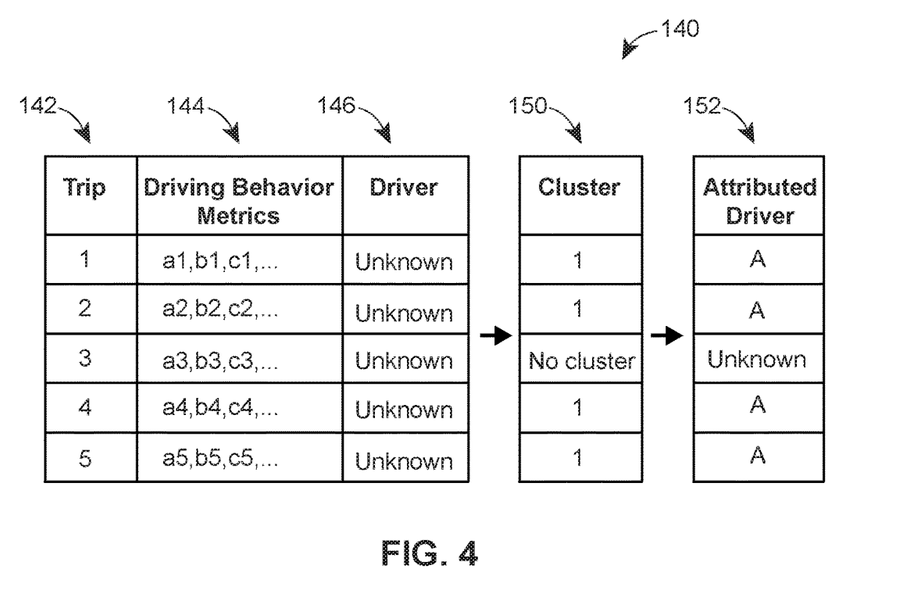
FIG. 4 depicts yet another exemplary process for attributing multiple sets of anonymous vehicle telematics data to individuals, according to one implementation and scenario.

Referring now to FIG. 4, an example process 140 reflects a scenario in which the relevant insurance policy lists only a single driver. In this scenario, trips 142, metric sets 144 and drivers 146 may be similar to trips 102, metric sets 104 and drivers 106 of process 100. However, only five trips 142 are shown in FIG. 4 (i.e., N is equal to five in FIG. 1). In this implementation and scenario, statistical analysis unit 30 may employ an anomaly detection technique, and label each of metric sets 144 as either not being anomalous (cluster "1" in FIG. 4) or as being anomalous ("No cluster" in FIG. 4). Statistical analysis unit 30 may decide to use the anomaly detection technique in response to disclosed driver determination unit 26 determining that the policy lists only one driver, for example. Attribution unit 32 may then assign those of the metric sets 144 that correspond to Trips 1, 2, 4 and 5, and/or the corresponding telematics data portions, to the sole disclosed driver (Driver A), and attribute the remaining metric sets 144 (here, corresponding to Trip 3) and/or corresponding telematics data portions to either an "undetermined" category or an "undisclosed driver" category. In FIG. 4, this is reflected by the "unknown" designation in attributed drivers 152.

Figure 5:
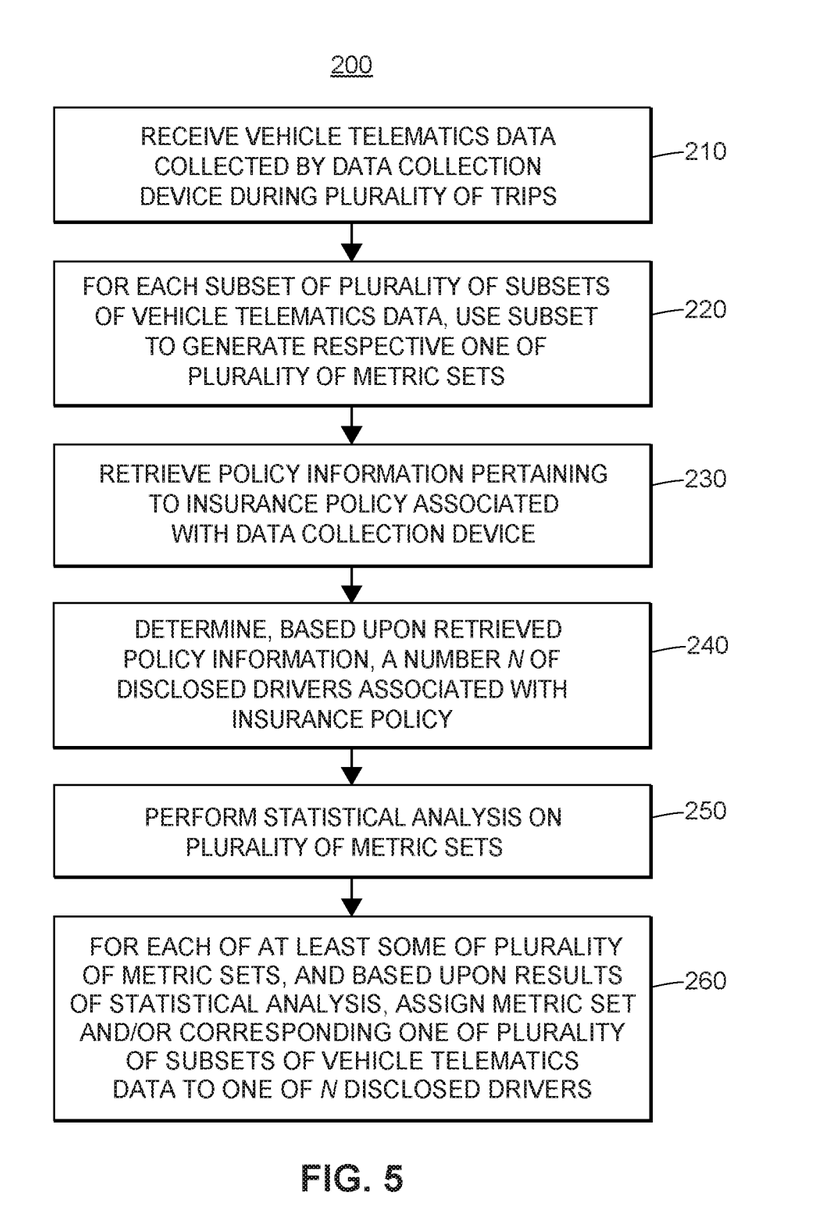
FIG. 5 is a flow diagram of an exemplary method for attributing vehicle telematics data to drivers, according to one implementation.

FIG. 5 depicts a flow diagram of an exemplary method 200 for attributing vehicle telematics data to individuals, according to an embodiment. In one embodiment, the method 200 may be implemented in (e.g., performed by one or more processors of) a server, such as the server 16 of FIG. 1, for example. As used herein, the term "server" may refer to a single computing device at a single location, or to a number of computing devices distributed across a number of different locations.

In the method 200, vehicle telematics data, collected by a data collection device during a plurality of trips, may be received (block 210). The trips may include a fixed number of trips (e.g., 50, 100, etc.) regardless of the times/dates associated with those trips, or may include all trips within a fixed amount time interval (e.g., a six month or one year policy period, etc.) regardless of the number of trips within that time interval, for example. The data collection device may be similar to any of the different implementations discussed above (e.g., including one or multiple components, etc.). The vehicle telematics data may include a plurality of subsets of vehicle telematics data, with each subset corresponding to a different one of the plurality of trips. The vehicle telematics data may be received by any suitable technique(s), such as any of the techniques for obtaining vehicle telematics data described above in connection with FIG. 1 (e.g., transferring to/from a portable memory, using wired and/or wireless communications, etc.), for example. The vehicle telematics data may include any data from which driving behaviors and/or features of the driving environment may be inferred or calculated. For example, the vehicle telematics data may include acceleration data, braking data, cornering data, G-force data, location data, etc., and may include data that was generated by an accelerometer, gyroscope, GPS device, camera, and/or one or more other units or sensor types.

Each subset of the vehicle telematics data may be used to generate a respective one of a plurality of metric sets (block 220). Each metric set may include one or more metrics, with each metric being indicative of a different driving behavior or a different feature of the driving environment. For example, a first metric type included in each metric set may be a measure of "smooth" driving, a second metric type included in each metric set may be a measure of average tailgating distance, a third metric type included in each metric set may be a measure of average cornering speed for a particular range of cornering radii, a fourth metric type included in each metric set may be a measure of a percentage of driving on highways, and so on.

Policy information pertaining to an insurance policy associated with the data collection device may be retrieved (block 230). The policy information may be retrieved from a database similar to policy database 34 of FIG. 1, for example. The insurance policy may be "associated" with the data collection device by virtue of being associated with an address or other identifier of the data collection device in a relational database (e.g., a relational database within policy database 34 of FIG. 1), for example.

A number N of drivers associated with the insurance policy may be determined based upon the retrieved policy information (block 240). For example, all of the drivers specified on the insurance policy may be counted to arrive at N. If a particular policy lists a primary insured, and also lists the spouse of the primary insured (but no others) as a potential driver, for example, N may be set equal to two. Generally, N may be any integer greater than or equal to zero. For example, N may be equal to zero if a vehicle associated with the insurance policy is known or expected to be in storage, or otherwise out of use.

A statistical analysis may be performed on the metric sets generated at block 220 (block 250). For example, a clustering algorithm, such as a k-means clustering algorithm, a Ward clustering algorithm, an EM clustering algorithm, or a flexible clustering algorithm, may be executed on the plurality of metric sets at block 250. Alternatively, a different type of algorithm (e.g., a machine learning algorithm) may be executed on the plurality of metric sets at block 250. In some implementations where a clustering algorithm is used, a parameter of the clustering algorithm is set equal to N prior to executing the algorithm. If a k-means clustering algorithm is used, for example, k may be set equal to N. In some implementations and/or scenarios, it is determined at block 250 that one or more metric sets are outliers (e.g., are not associated with any cluster, or are anomalous with respect to the other metric sets, etc.). For example, it may be determined that a first metric set is an outlier if it is at least a threshold distance from any cluster (e.g., from a centroid of any cluster).

For each metric set of at least some of the metric sets generated at block 220, and based upon the results of the statistical analysis performed at block 250, the metric set, and/or the subset of vehicle telematics data that corresponds to that metric set, may be assigned to one of the N disclosed drivers (block 260). As explained above, each metric set and/or data subset may be assigned to a specific individual (e.g., the primary insured, or a specific other disclosed driver), or may be assigned generally to one of multiple disclosed drivers. If the insurance policy lists John Doe and Jane Doe, and if the statistical analysis at block 250 executes a clustering algorithm that identifies exactly two clusters, for example, then either (1) the metric sets and/or telematics data subsets associated with one cluster may be specifically assigned to John Doe, and the metric sets and/or telematics data subsets associated with another cluster may be specifically assigned to Jane Doe, or (2) the metric sets and/or telematics data subsets associated with both clusters may be collectively assigned to both John Doe and Jane Doe, with no specification of which metrics and/or telematics data subsets are assigned to which of the two disclosed drivers. Metrics and/or telematics data subsets may be assigned by setting values or links in a relational database, or in another suitable manner. In some implementations, for example, a single flag value is set at block 260, where the flag indicates whether the number of clusters exceeds the number N of disclosed drivers. For instance, a first value of the flag may indicate that all metric sets and/or telematics data subsets are generally assigned to the N disclosed drivers, and a different, second value of the flag may indicate that at least one metric set and/or telematics data subset is attributed to an undisclosed driver. If it was determined at block 250 that one or more metric sets are outliers, that/those metric set(s) and/or corresponding telematics data subset(s) may not be assigned to any disclosed driver.

In an alternative embodiment, blocks 230 and 240 are omitted from the method 200, and there are no assumptions made about the expected number of drivers (or it may generally be assumed that there is "at least one" driver, etc.). For example, the vehicle telematics data received at block 210 may be associated with an individual applying for insurance coverage and/or seeking an insurance quote. In one such embodiment and/or scenario, it may be assumed that a largest cluster is associated with a potential primary insured, and that all other well-defined clusters, if any, are associated with others who would drive under a policy of the primary insured (e.g., family members of driving age). Any outliers that do not belong to any cluster may then be assigned to an "unknown" driver category and be discarded, for example.

In some implementations, the method 200 may include one or more blocks not shown in FIG. 5. In some implementations where a clustering algorithm is executed, for example, block 250 may include identifying the number of clusters, m, and the method 200 may include an additional block in which it is determined, in response to identifying the m clusters, that there are m−N undisclosed drivers. As another example, the method 200 may include an additional block in which an insurance rating associated with the insurance policy is caused to be adjusted (e.g., by sending a rating score to another server, etc.) based upon the vehicle telematics data received at block 210, and further based upon the manner in which metric sets and/or telematics data subsets are assigned to the N disclosed drivers (e.g., taking into account which metric sets and/or telematics data subsets, if any, are specifically assigned to the primary insured, etc.). As yet another example, the method 200 may include an additional block in which one, some or all of the assignments made at block 260 (and/or other determinations, such as whether any metric sets and/or telematics data subsets are attributed to an undisclosed driver) are presented to a user via a user interface of a computing device. Moreover, in some implementations and/or scenarios, the blocks of the method 200 may occur in a different order than that shown in FIG. 5. For example, block 210 may in part occur during and/or after block 220, blocks 230 and 240 may occur before block 220 (or after block 250), and so on.

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process of attributing vehicle telematics data to individuals. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:

1. A method for attributing vehicle telematics data to individuals, the method comprising:

receiving, at a server, vehicle telematics data collected by a data collection device during a plurality of trips, wherein the vehicle telematics data includes a plurality of subsets of vehicle telematics data each corresponding to a different one of the plurality of trips;

for each subset of the plurality of subsets of vehicle telematics data, using the subset of vehicle telematics data to generate a respective one of a plurality of metric sets, wherein each of the plurality of metric sets includes a plurality of metrics each indicative of a different driving behavior or a different feature of a driving environment;

retrieving, by the server and from a policy database, policy information pertaining to an insurance policy associated with the data collection device;

determining, by the server and based upon the retrieved policy information, a number N of disclosed drivers associated with the insurance policy, N being greater than or equal to zero;

performing, by the server, a statistical analysis on the plurality of metric sets at least by executing a k-means clustering algorithm on the plurality of metric sets, wherein executing the k-means clustering algorithm includes (i) setting k equal to N, and (ii) generating indications of which of the plurality of metric sets belong to which of k clusters, each of the k clusters corresponding to a different one of the N drivers;

for each metric set of at least some of the plurality of metric sets, and based upon the generated indications, assigning, by the server, one or both of (i) the metric set, and (ii) the corresponding one of the plurality of subsets of vehicle telematics data, to one of the N disclosed drivers; and causing, by the server, an insurance rating associated with the insurance policy to be adjusted based at least in part on (i) the vehicle telematics data and (ii) the manner in which the corresponding ones of the plurality of metric sets or the plurality of subsets of vehicle telematics data are assigned to the N disclosed drivers.

2. The method of claim 1, wherein using the subset of vehicle telematics data to generate the respective one of the plurality of metric sets includes using at least two of (i) global positioning satellite (GPS) data, (ii) accelerometer data, and (iii) gyroscope data, to calculate a respective first metric.

3. The method of claim 1, wherein determining the number N of disclosed drivers includes counting all drivers specified on the insurance policy.

4. The method of claim 1, wherein:

executing the clustering algorithm on the plurality of metric sets includes determining that a first metric set of the plurality of metric sets is an outlier not associated with any cluster; and the method further comprises, not assigning to any driver both (i) the first metric set and (ii) the one of the plurality of subsets of vehicle telematics data that corresponds to the first metric set.

5. The method of claim 4, wherein determining that the first metric set is an outlier includes determining that the first metric set is at least a threshold distance from any cluster.

6. The method of claim 1, wherein receiving vehicle telematics data collected by a data collection device during a plurality of trips includes receiving vehicle telematics data collected by a mobile telephone device during the plurality of trips.

7. A server comprising:
one or more processors; and
a memory storing instructions that, when executed by the server, cause the server to
receive vehicle telematics data collected by a data collection device during a plurality of trips, wherein the vehicle telematics data includes a plurality of subsets of vehicle telematics data each corresponding to a different one of the plurality of trips, for each subset of the plurality of subsets of vehicle telematics data, use the subset of vehicle telematics data to generate a respective one of a plurality of metric sets, wherein each of the plurality of metric sets includes a plurality of metrics each indicative of a different driving behavior or a different feature of a driving environment, retrieve, from a policy database, policy information pertaining to an insurance policy associated with the data collection device, determine, based upon the retrieved policy information, a number N of disclosed drivers associated with the insurance policy, N being greater than or equal to zero, perform a statistical analysis on the plurality of metric sets at least by executing a k-means clustering algorithm on the plurality of metric sets, wherein executing the k-means clustering algorithm includes (i) setting k equal to N, and (ii) generating indications of which of the plurality of metric sets belong to which of k clusters, each of the k clusters corresponding to a different one of the N drivers, for each metric set of at least some of the plurality of metric sets, and based upon the generated indications, assign one or both of (i) the metric set, and (ii) the corresponding one of the plurality of subsets of vehicle telematics data, to one of the N disclosed drivers, and cause an insurance rating associated with the insurance policy to be adjusted based at least in part on (i) the vehicle telematics data and (ii) the manner in which the corresponding to ones of the plurality of subsets of vehicle telematics data are assigned to the N disclosed drivers.

8. The server of claim 7, wherein the one or more metrics include a first metric calculated using at least two of (i) global positioning satellite (GPS) data, (ii) accelerometer data, and (iii) gyroscope data.

* * * * *